Oct. 3, 1944.    N. WANGSNESS    2,359,399
HARROW HITCH
Filed July 26, 1943    2 Sheets-Sheet 2
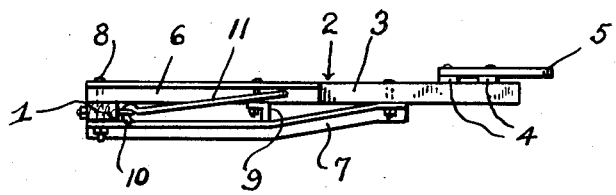
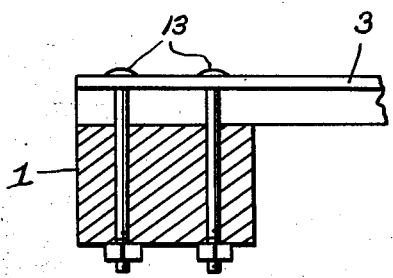
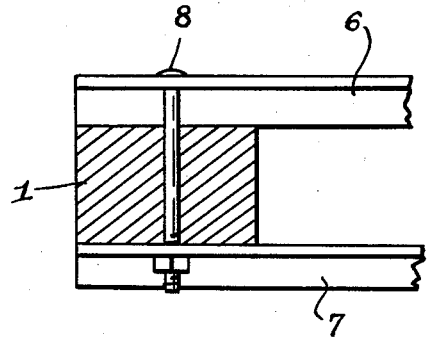
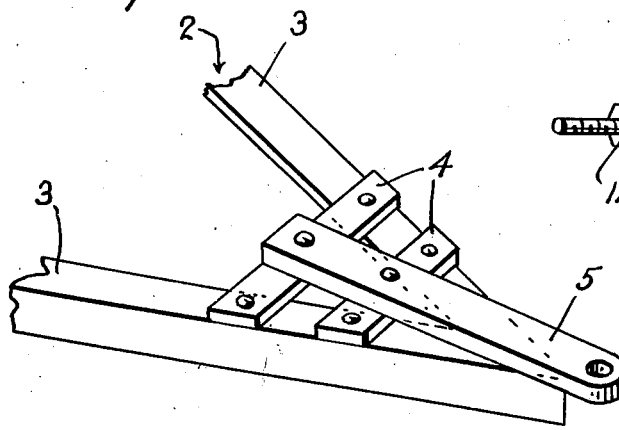
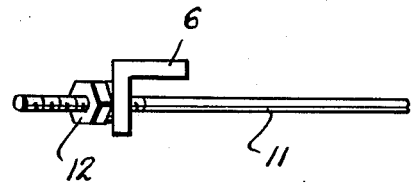
Inventor
Nels Wangsness Patented Oct. 3, 1944

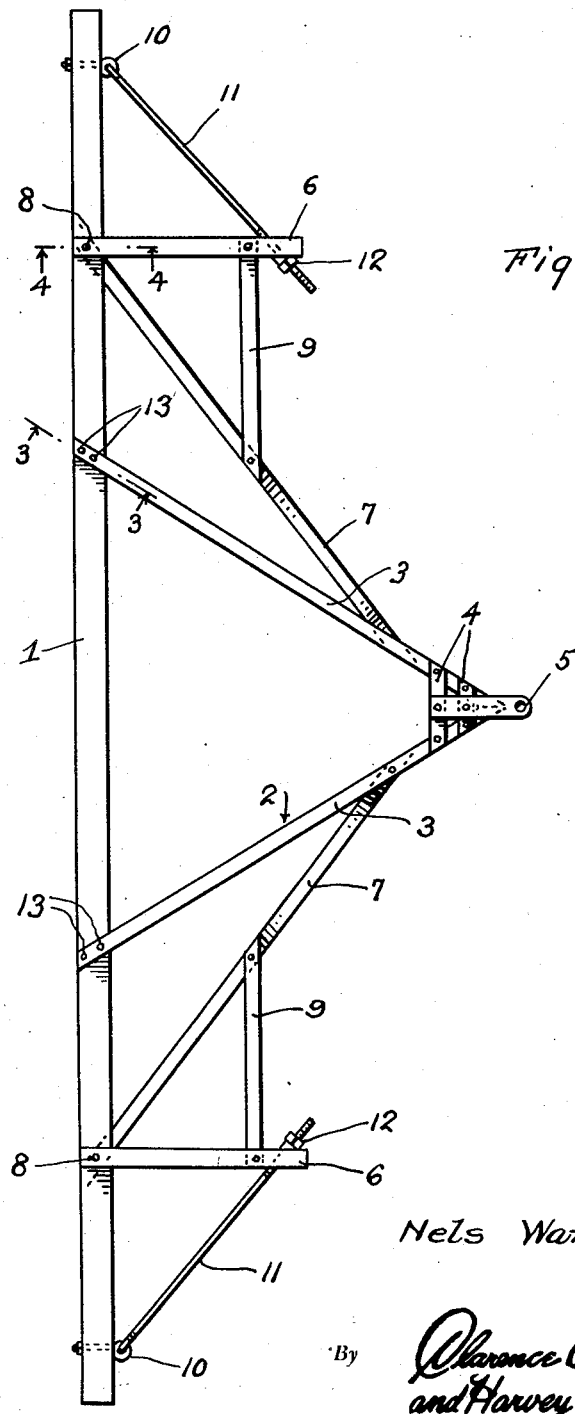

2,359,399

UNITED STATES PATENT OFFICE 2,359,399

HARROW HITCH

Nels Wangsness, Skyberg, Minn.

Application July 26, 1943, Serial No. 496,188

1 Claim. (Cl. 280—33.44)

The present invention relates to new and useful improvements in adjustable tractor hitches for multiple section field harrows, and has for its primary object to provide, in a manner as hereinafter set forth, a device of this character comprising a novel construction and arrangement whereby short turns may be made without danger of the tractor wheels engaging and throwing the hitch and harrow sections upwardly with the accompanying danger of injuring the operator.

Other objects of the invention are to provide a hitch of the aforementioned character which will be comparatively simple in construction, strong, durable, highly efficient and reliable in use, compact, light in weight, and which may be manufactured at low cost.

All of the foregoing, and still further objects and advantages of the invention will become apparent from a study of the following specification, taken in connection with the accompanying drawings, wherein like characters of reference designate corresponding parts throughout the several views, and wherein:

Figure 1 is a top plan view of a hitch constructed in accordance with the present invention.

Figure 2 is a view in side elevation thereof.

Figures 3 and 4 are fragmentary views in vertical section, taken substantially on the lines 3—3 and 4—4, respectively, of Figure 1.

Figure 5 is a perspective view of the forward portion of the device.

Figure 6 is a detail view in front elevation of one of the side portions of the brace structure.

Referring now to the drawings in detail, it will be seen that reference character 1 designates a beam of suitable material, preferably wood. The beam 1 may be of any desired length, according to the number of harrow sections to be attached thereto.

Mounted on the beam 1 and projecting forwardly therefrom is a substantially V-shaped frame which is designated generally by reference numeral 2. In the embodiment shown, the V-frame 2 comprises forwardly converging bars 3 of angle iron having their rear end portions firmly secured on the beam 1. The forward end portions of the bars 3 are secured together through the medium of transverse bars 4. A tongue 5 is mounted on the bars 4 and projects forwardly therefrom for connection with the draw bar of the tractor.

Arms 6 are rigidly mounted on top of the beam 1 at points intermediate the frame 2 and the ends of said beam. Braces 7 have one end secured to the forward portions of the bars 3 and their other end portions secured beneath the beam 1. Bolts 8 secure the members 6 and 7 to the beam 1. Struts 9 extend between the members 6 and 7. The members 6, 7 and 9 are also of angle iron.

Eye bolts 10 are mounted in the end portions of the beam 1. Metallic rods 11 are loosely connected at one end to the eye bolts 10. The other end portions of the rods 11, which are threaded, pass through the forward end portions of the arms 6 and have mounted thereon adjusting nuts 12.

It is thought that the manner in which the device functions will be readily apparent from a consideration of the foregoing. Briefly, the members 6, 7, 9 and 11, et cetera, brace and support the outer portions of the beam 1. However, the construction and arrangement is such as to avoid contact by the rear wheels of the tractor when negotiating a turn. Thus, danger of the operator being injured is substantially eliminated. The arrangement shown is for a five-section field harrow. However, the construction may be readily modified to be used in conjunction with more harrow sections, if desired. Bolts 13 secure the rear end portions of the bars 3 on the beam 1.

It is believed that the many advantages of a harrow hitch constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A harrow hitch comprising an elongated transverse beam adapted to have a plurality of harrow sections connected thereto to be drawn thereby, a V-shaped frame rigidly mounted on and projecting forwardly from the intermediate portion of the beam, said frame consisting of forwardly converging bars fixed at their rear ends upon the beam, a short tongue fixed on and projecting forwardly from the front of said frame, an arm secured upon the beam intermediate each side of the frame and the adjacent end of the beam, said arm being shorter than the frame and projecting forwardly from the beam at right angles to the latter, a brace connecting the beam with the forward part of the frame at each side of the latter, the rear ends of the braces being disposed against the under side of the beam, a bolt extending through the rear ends of each arm and the adjacent brace to secure them to the beam, a transverse strut connecting the forward portion of each arm with the intermediate portion of the adjacent brace and extending substantially parallel with the beam, and an adjustable tie rod connection between the forward end portion of each arm and the adjacent end of the beam.

NELS WANGSNESS.